(12) United States Patent
Yonemitsu

(10) Patent No.: US 6,856,962 B2
(45) Date of Patent: *Feb. 15, 2005

(54) SCHEDULE MANAGEMENT SYSTEM

(75) Inventor: Tetuya Yonemitsu, Yokohama (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 214 days.

(21) Appl. No.: 09/217,077

(22) Filed: Dec. 21, 1998

(65) Prior Publication Data

US 2001/0029460 A1 Oct. 11, 2001

(30) Foreign Application Priority Data

Dec. 26, 1997 (JP) ............................................. 9-359280

(51) Int. Cl.[7] .......................................... G06F 17/60
(52) U.S. Cl. .............................................. 705/8; 705/9
(58) Field of Search ........................................ 705/8, 9

(56) References Cited

U.S. PATENT DOCUMENTS

| | | | | |
|---|---|---|---|---|
| 4,807,154 A | * | 2/1989 | Scully et al. ................ | 345/751 |
| 4,807,155 A | * | 2/1989 | Cree et al. ................... | 345/733 |
| 4,817,018 A | * | 3/1989 | Cree et al. ................... | 345/751 |
| 4,819,191 A | * | 4/1989 | Scully et al. ................ | 345/751 |
| 4,831,552 A | * | 5/1989 | Scully et al. ................ | 345/751 |
| 4,866,611 A | * | 9/1989 | Cree et al. ................... | 708/112 |
| 5,070,470 A | * | 12/1991 | Scully et al. ................ | 708/112 |
| 5,093,901 A | * | 3/1992 | Cree et al. ................... | 345/753 |
| 5,261,045 A | * | 11/1993 | Scully et al. ................ | 345/751 |
| 5,303,145 A | * | 4/1994 | Griffin et al. ................ | 364/401 |
| 5,519,606 A | * | 5/1996 | Frid-Niesen et al. ........ | 364/401 |
| 5,774,867 A | * | 6/1998 | Fitzpatrick et al. ............ | 705/8 |
| 5,781,731 A | * | 7/1998 | Koreeda et al. ....... | 395/200.34 |
| 5,974,394 A | * | 10/1999 | Nakayama et al. ............ | 705/8 |
| 6,101,480 A | * | 8/2000 | Conmy et al. ................. | 705/9 |

FOREIGN PATENT DOCUMENTS

| | | |
|---|---|---|
| JP | 7-121610 | 5/1995 |
| JP | 9-330356 | 12/1997 |

OTHER PUBLICATIONS

Willen, Claudia. The ABCs of Outlook 97, published by Sybex [downloaded from Books 24×7] Mar. 17, 1997, Chapters 5, 9, 10, 14.*

Microsoft Outlook 97: Administrator's Guide. The Professional Companion to Outlook 97, published by Microsoft Corporation. 1997.*

* cited by examiner

Primary Examiner—Tariq R. Hafiz
Assistant Examiner—Johnna Stimpak
(74) Attorney, Agent, or Firm—Mattingly, Stanger & Malur, P.C.

(57) ABSTRACT

A schedule management system includes a schedule data table which stores the schedule data including an identifier of a schedule owner, the time zone, activity and the state of the schedule. A definition data table stores the definition data for determining the relation between the registration and display of the schedule and the schedule and the state in he schedule data. A schedule data registration unit accepts a schedule reservation request, determines whether the schedule registration is permitted or not based on the schedule state of the schedule data existing in the schedule data table and the definition data, and when the schedule registration is permitted, registers the reservation schedule in the schedule data table. A schedule data approval unit accepts a request from the schedule owner for approving/disapproving the schedule and rewrites the schedule state of the corresponding schedule data in the schedule data table. A schedule display unit accepts a schedule display request, determines whether the existing schedule is displayed or not based on the schedule state of the schedule data existing in the schedule data table and the definition data, and displays only the schedule data determined for display.

11 Claims, 8 Drawing Sheets

FIG.2

| No. | USER ID | RESERVATION STATE | STARTING TIME | ENDING TIME | ACTIVITY | REGISTRANT ID |
|---|---|---|---|---|---|---|
| 1 | User001 | APPROVED | 1997.06.30 10:00 | 1997.06.30 13:00 | PRELIMINARY MEETING | User010 |
| 2 | User001 | UNREAD | 1997.06.30 11:00 | 1997.06.30 14:00 | MEETING | User008 |
| 3 | User001 | SUSPENDED | 1997.06.30 12:00 | 1997.06.30 13:00 | LUNCH | User021 |
| 4 | User001 | DISAPPROVED | 1997.06.30 15:00 | 1997.06.30 16:00 | SOCIAL MEETING | User011 |
| 5 | User001 | UNREAD | 1997.06.30 17:00 | 1997.06.30 19:00 | MEETING | User012 |
| 6 | User001 | SUSPENDED | 1997.06.30 18:00 | 1997.06.30 19:00 | DINNER | User005 |
| 7 | User001 | — | 1997.06.30 20:00 | 1997.06.30 23:00 | READING | User001 |
| 8 | User001 | — | 1997.07.01 10:00 | 1997.07.01 18:00 | BUSINESS TRIP | User001 |
| 9 | User002 | APPROVED | 1997.07.07 10:00 | 1997.07.07 13:00 | PRELIMINARY MEETING | User003 |
| 10 | User003 | UNREAD | 1997.07.10 08:00 | 1997.07.10 10:00 | EDUCATION | User010 |
| 11 | User003 | — | 1997.07.11 08:00 | 1997.07.11 12:00 | HALF-DAY OFF | User003 |

| | APPROVED | DIS-APPROVED | SUSPENDED | UNREAD |
|---|---|---|---|---|
| DISPLAY | ○ | × | × | ○ |
| REGISTRATION | × | ○ | ○ | ○ |

| | 1997.6.30 Mon | 1997.7.1 Tue |
|---|---|---|

- 9
- 10 — 501 PRELIMINARY MEETING, APPROVED
- 11 — 502 MEETING, UNREAD
- 12 — 503 LUNCH, SUSPENDED
- 13
- 14
- 15 — 505 SOCIAL MEETING, DISAPPROVED
- 16
- 17 — MEETING, UNREAD
- 18 — DINNER, SUSPENDED
- 19
- 20

504 BUSINESS TRIP

FIG.6

|  | 1997.6.30 Mon | 1997.7.1 Tue |
|---|---|---|
| 9 | | 603 |
| 10 | 601 | |
| 11 | PRELIMINARY MEETING, APPROVED | 602 |
| 12 | | MEETING, UNREAD |
| 13 | | |
| 14 | | BUSINESS TRIP |
| 15 | | |
| 16 | | |
| 17 | | |
| 18 | MEETING, UNREAD | |
| 19 | | |
| 20 | | |

FIG.8

| DATE | UNOCCUPIED TIME ZONE |
|---|---|
| 1997/6/30 | 0:00 ~ 10:00 |
| 1997/6/30 | 14:00 ~ 17:00 |
| 1997/6/30 | 19:00 ~ 20:00 |
| 1997/6/30 | 23:00 ~ 24:00 |

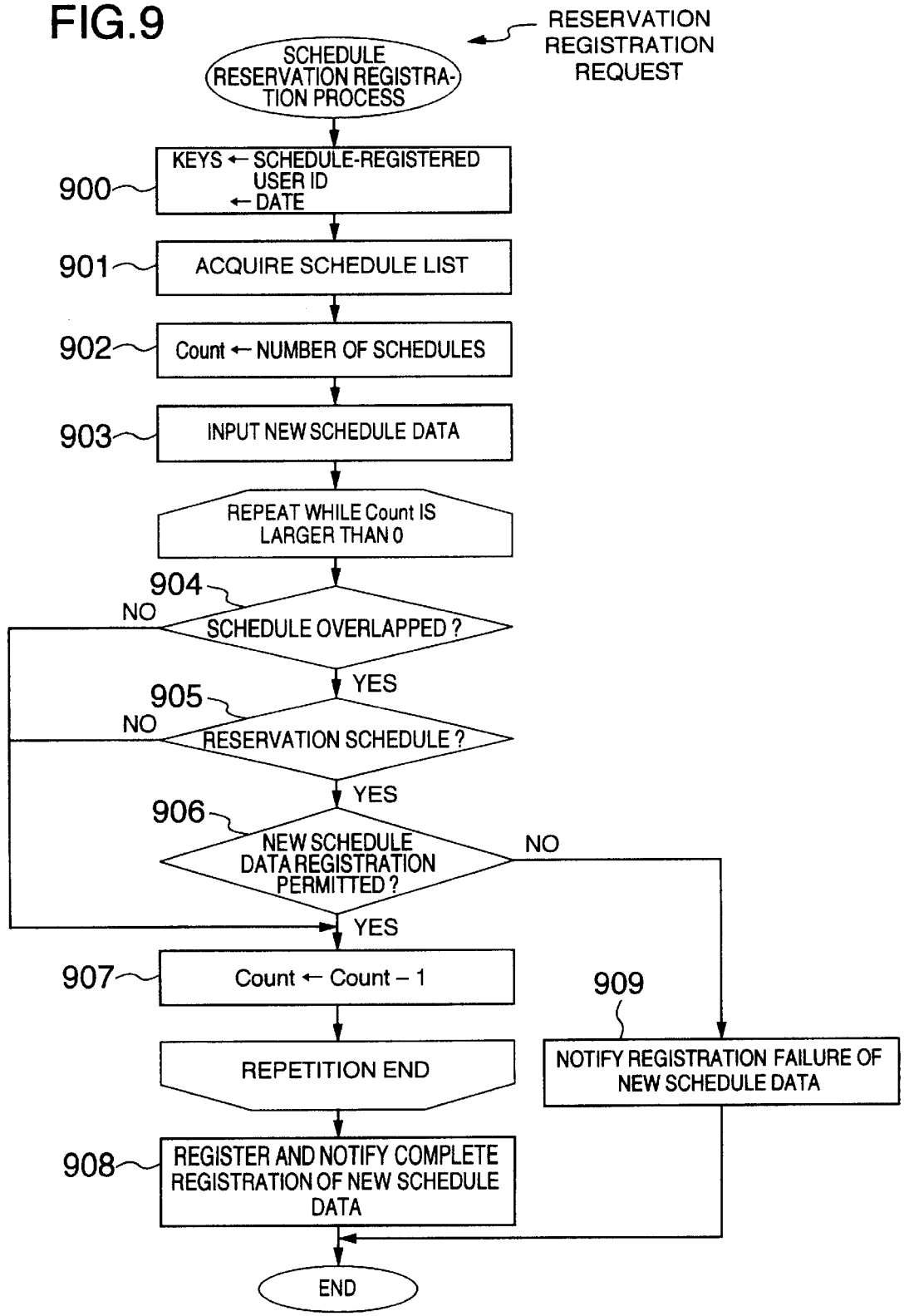

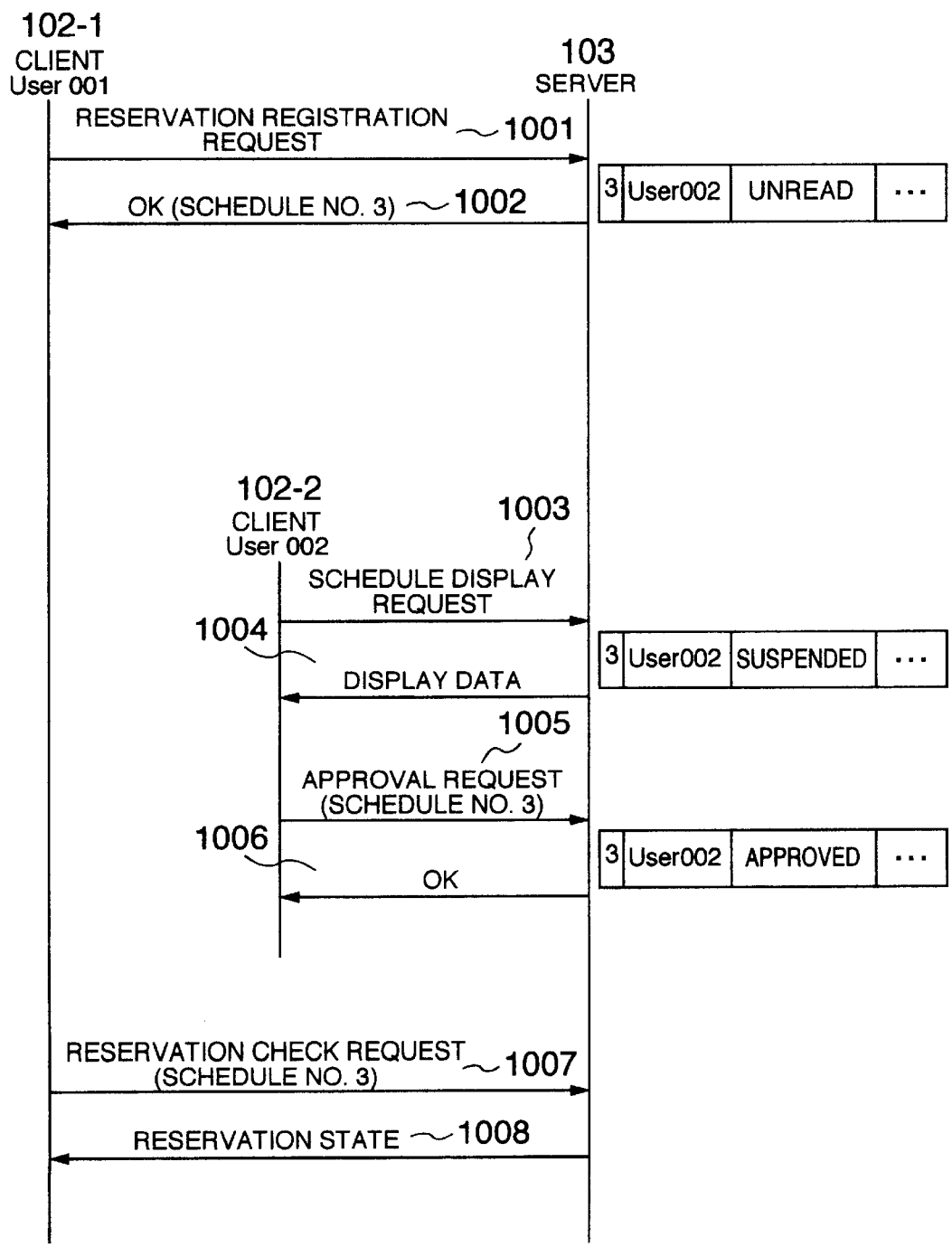

SCHEDULE MANAGEMENT SYSTEM

BACKGROUND OF THE INVENTION

1. Field of the Invention

The present invention relates to a schedule management method and a schedule management system for managing a schedule utilizing the computer.

2. Description of the Related Art

It is known that a schedule for persons and facilities such as a meeting room are managed on a server/client system.

In the conventional schedule management system, a person A who tries to reserve and register a schedule of a person B first displays the schedule of the person B and selects an optimum time by finding an unoccupied time.

JP-A-7-121610 discloses a technique by which a planner of an event collectively displays the persons related to the event and the schedules for the facilities used.

SUMMARY OF THE INVENTION

In the above-mentioned conventional schedule management system, all the reservation schedules are displayed regardless of whether a schedule owner has approved a particular schedule or not. Also, even in the presence of an established schedule, a new schedule is reserved and registered overlapped with the established schedule.

The object of the present invention is to provide a schedule management system which allows selection as to whether a schedule in registration is displayed or not and whether the registration of a new overlapped reservation schedule is permitted or not, depending on the state of the reservation schedules in registration.

In order to achieve the object described above, according to the present invention, there is provided a schedule management system comprising a schedule data table for storing the schedule data including an identifier of a schedule owner, the time zone, the activity and the state of a schedule, a definition data table for storing the definition data for determining the relation between the registration and display of the schedule and the schedule state in the schedule data, a schedule data registration unit for receiving a schedule reservation request, determining whether the schedule registration is permitted or not based on the schedule state of the schedule data existing in the schedule data table and the definition data, and when the schedule registration is permitted, registering the reservation schedule in the schedule data table, a schedule data approval unit for accepting a request from the schedule owner for approving/disapproving the schedule and rewriting the schedule state of the corresponding schedule data in the schedule data table, and a schedule display unit for accepting a schedule display request, determining whether the existing schedule is displayed or not based on the schedule state of the schedule data existing in the schedule data table and the definition data, and displaying only the schedule data determined for display.

Further, a schedule management system may comprise an unoccupied time search unit for accepting an unoccupied time search request for a schedule and determining whether the time zone of the schedule is rendered an occupied time or not based on the schedule state of the schedule data existing in the schedule data table and the definition data, and when determining that the time zone of the schedule is rendered an occupied time, displaying an unoccupied time by removing the time zone of the schedule from the unoccupied time.

BRIEF DESCRIPTION OF THE DRAWINGS

FIG. 2 shows an example of the record format and the record of a schedule data storage unit.

FIG. 3 shows an example of the definition of a definition data storage unit.

FIG. 5 shows an example of a local schedule data displayed.

FIG. 6 shows an example of a remote schedule data displayed.

FIG. 8 shows an example of an unoccupied time list displayed.

FIG. 9 is a flow chart showing the operation of receiving a request for registering a schedule reservation.

FIG. 10 is a diagram explaining a general method of using the system.

DESCRIPTION OF THE PREFERRED EMBODIMENTS

(1) System Configuration

Figure 1:
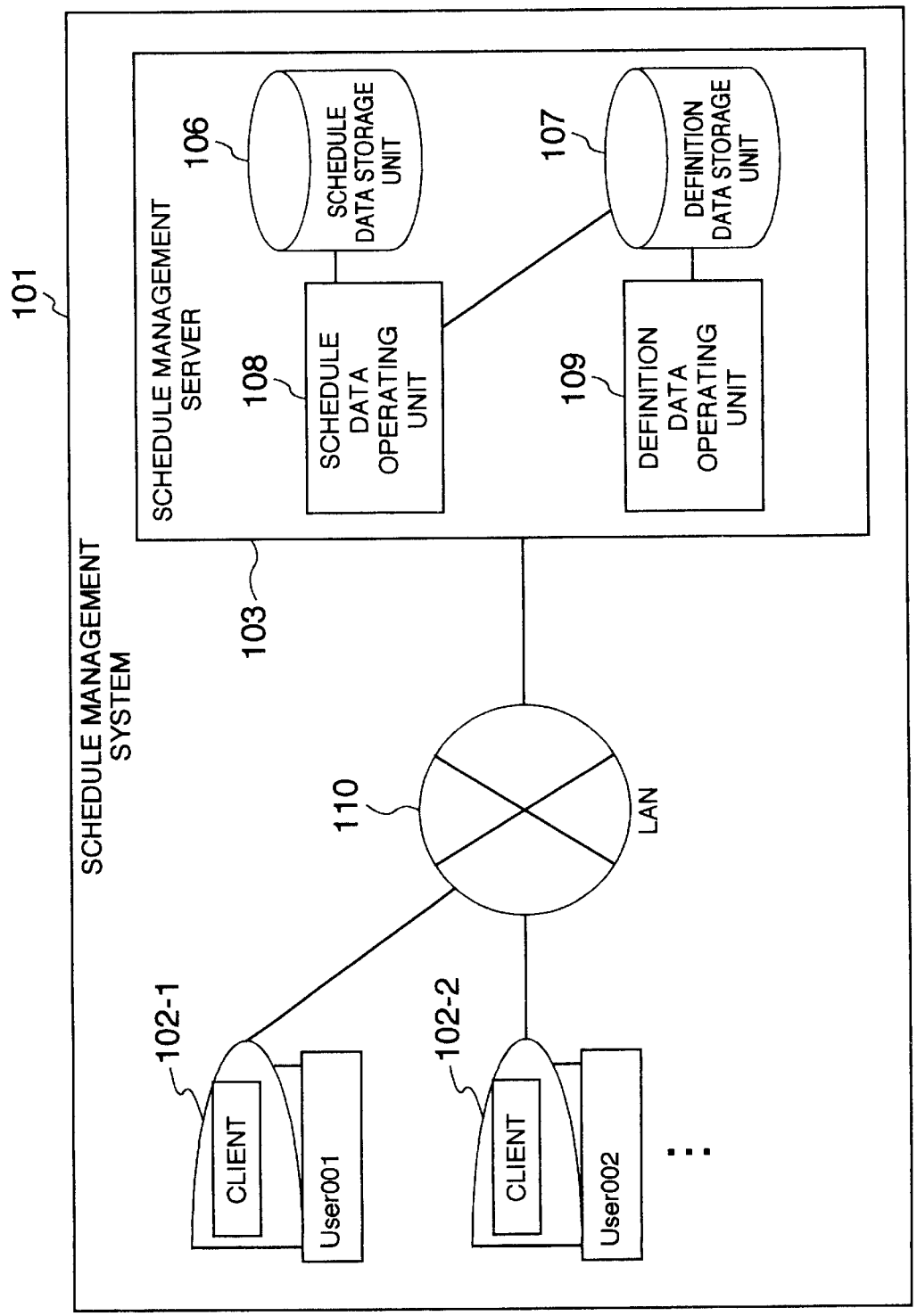
FIG. 1 is a block diagram showing a schedule management system according to an embodiment of the present invention.

FIG. 1 is a diagram showing a configuration of a schedule management system according to an embodiment.

A schedule management system 101 comprises schedule management clients 102, a schedule management server 103 and a communication network 110 connecting the server and the clients.

The clients 102-1, 102-2 are each assigned a user ID such as "User001", "User002", and are connected with the schedule management server 103 via the communication network 110. Although two clients are shown in FIG. 1, the number of clients connected to the server is not limited to two. Each client transmits the input data or a request to the server via the communication network and also displays the information transmitted from the server.

The schedule management server 103 comprises a schedule data storage unit 106, a definition data storage unit 107, a schedule data operating unit 108, and a definition data operating unit 109. The schedule data storage unit 106 stores the schedule data for persons and facilities, and the schedule data operating unit 108 operates (registration, reference, change and deletion) the data in the schedule data storage unit. The definition data storage unit 107 stores the definition data for defining the manner of handling the schedule data for registration and display, and the definition data operating unit 109 sets the definition data.

The schedule management server 103 and the clients 102 each includes a computer such as a personal computer or a work station including an input/output unit, a CPU, a memory and a communication network interface. The transmission of requests and data from the clients, the display of the information sent from the schedule management server and the user interface are realized by software executed by the CPU of the clients. The schedule data operating unit 108 and the definition data operating unit 109 of the schedule management server are realized by software executed by the CPU of the schedule management server, and the data storage units 106, 107 are realized by a memory (a main memory and/or an external memory) in the schedule management server.

The communication network 110 is a general-purpose network such as a LAN (local area network). The communication between the server and the clients is effected in accordance with the protocol used by the communication network 110. In the case where the network is a LAN, the protocol is TCP/IP.

FIG. 2 shows an example of a record format and a record in the schedule data storage unit 106. The record includes a user ID, a reservation state, a starting time, an ending time, an activity, a schedule No. and a registrant ID. The schedule No. is an identifier of the schedule data. The user ID represents the owner of the schedule and is information for identifying the clients. The user ID may be the name of a facility such as a first meeting room or a guest room A. In this case, the schedule is adjusted by the facility manager. The user IDs and the facility names are unique in the system.

The reservation state is the state of the schedules reserved and registered, and includes "approved", "disapproved", "suspended" and "unread" (described later). The symbol "-" in FIG. 2 indicates the schedule data registered locally, that is, registered by the schedule owner. The starting time is the time when the schedule starts, the ending time is the time when the schedule ends, and the activity indicates the business of the schedule. The registrant ID indicates a person who has registered a reservation. Further, the schedule data can include additional information such as the object of the schedule, the place and participants.

In the example shown in FIG. 2, the schedule data for a plurality of user IDs are stored sequentially in a single table for facilitating the understanding. Actually, however, each user ID has a pointer indicating the earliest-registered record of the schedule data owned by the particular user ID. Also, each record has a pointer indicating the next-registered record, so that the schedule data are chained sequentially in the order of registration. The table of FIG. 2 can be realized by other than this format.

FIG. 3 shows an example of definition in the definition data storage unit 107. The definition data defines the manner in which a schedule data display request or a reservation registration request is processed upon receipt thereof, in accordance with the schedule reservation state. In the case of FIG. 3, the system displays the schedule data approved or unread, but does not display the schedule data disapproved or suspended, upon receipt of a request for displaying the schedule data. Also, the schedule management system according to this embodiment has the function of searching for an unoccupied time, and upon receipt of an unoccupied time search request, the search result is displayed in accordance with the definition of FIG. 3. Specifically, a schedule is assumed to exist for the schedule data approved or not read, and the time zone for the schedule data disapproved or suspended is kept unoccupied.

Also, the definition data registration unit 107 defines whether or not a new reservation registration request from another client is accepted in the case where a schedule already exists in the same time zone. In the embodiment, if the existing schedule data is approved, the new registration request is rejected, whereas if the existing schedule is disapproved, suspended or unread, the new schedule data is registered.

The system has one definition data 107 of FIG. 3 which can be applied to all the users or facilities. As another method, the definition data is produced for each user or each facility, so that a corresponding data can be referred to at the time of registration or display of a schedule owned by a user or a facility.

In the former case, the definition data is produced by the system manager on the schedule management server 103. In the latter case, on the other hand, the definition data is produced on the clients 102 and sent to the server 103 by each user or facility manager. In either case, the definition data is produced and updated through the definition data operating unit 109.

(2) System Operation

FIG. 10 shows an ordinary method of use and an example operation of the schedule management system 101. In this case, a user having ID User001 (hereinafter referred to as User001) reserves a schedule of a user having ID User002 (hereinafter referred to as User002).

A menu is displayed on the client 102-1 of User001, and User001 selects the schedule reservation registration process. Then, the screen switches to the one for inputting the record items of FIG. 2. Upon complete record item input by User001 and selection of the transmission button, the client 102-1 transmits the input items as a reservation registration request 1001 to the server 103.

The schedule data operating unit 108 of the server 103 checks the reservation registration request (described later), registers it in the schedule data storage unit 106 as the schedule data of User002, and transmits a registration OK 1002 to the client 102-1 together with the schedule number. In the process, the reservation state of this data is "unread". Though not shown in FIG. 10, the server 103 can notify User002 that the reservation of the schedule has been registered anew.

A menu is displayed on the client 102-2 of User002. Upon selection of a schedule display by User002, the client 102-2 transmits a schedule display request 1003. The server 103 selects a part of the schedule data associated with User002 (described later). The "unread" record then selected is changed to "suspended" in reservation state. The server 103 transmits the selected schedule data as display data to the client 102-2 (1004).

The client 102-2 displays the transmitted display data in the form shown in FIG. 5. User002 selects a "suspended" schedule (say, 502), and approves/disapproves the schedule using the pull-down menu. The approval/disapproval is transmitted as an approved request (1005) or a disapproved request to the server 103 from the client 102-2. The server 103 changes the reservation state of the record to "approved" or "disapproved", and notifies the change to the client 102-2 (1006). Though not shown in FIG. 10, the server 103 can notify User001 as to whether the schedule of which the reservation has been registered is approved or not.

When User001 selects the reservation check from the menu on the client 102-1 again, the client 102-1 transmits a reservation check request 1007 to the server 103 together with the schedule number of the schedule data of which the reservation has been registered. The server 103 checks the schedule data having the schedule number sent to him, and transmits the reservation state ("approved" 1008 in the case of FIG. 10) to the client 102-1.

(4) Server Operation

An explanation will be given of the operation of the schedule data operating unit 108 of the schedule management server 103.

Figure 4:
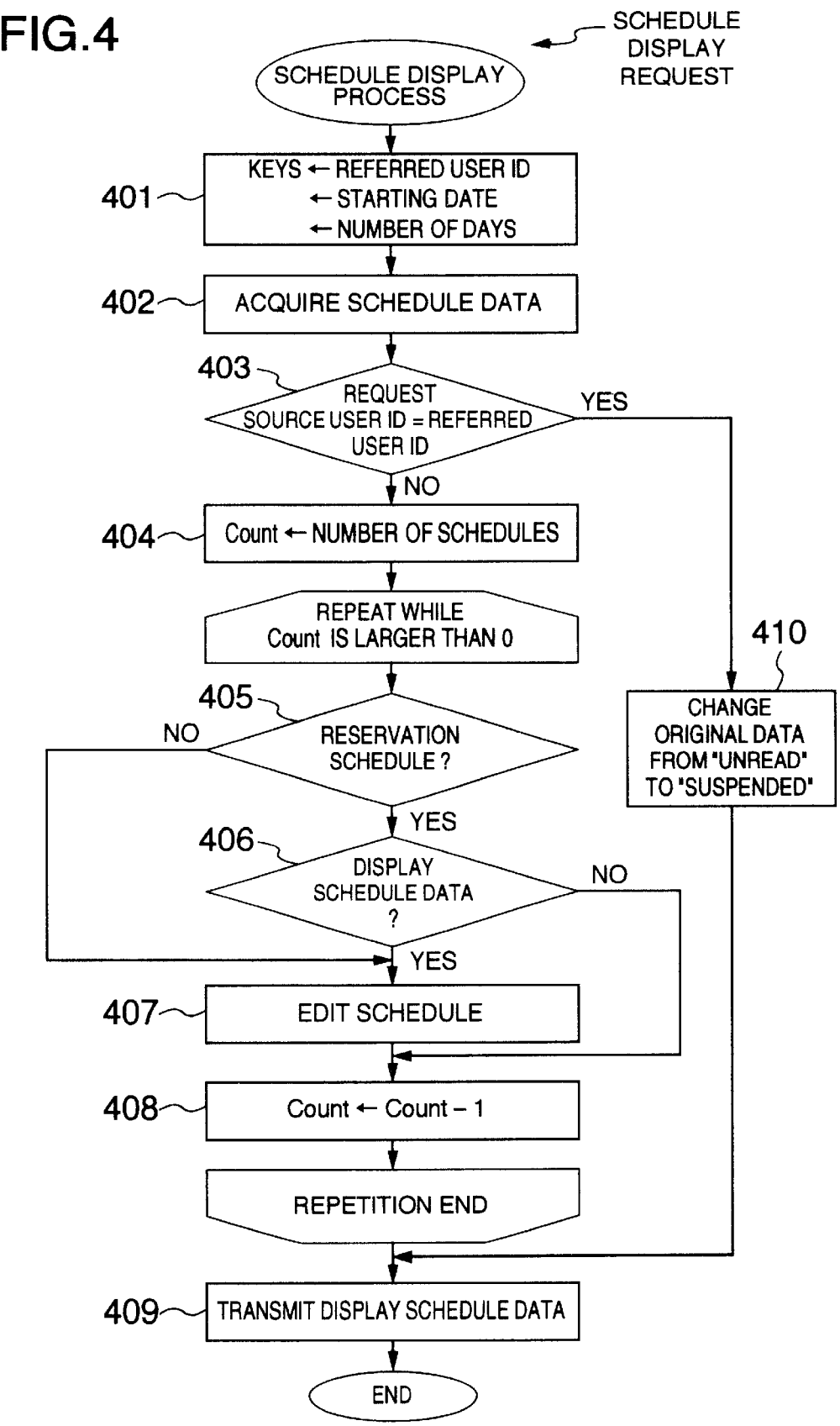
FIG. 4 is a flow chart showing the operation of receiving a schedule display request.

Assume that the server 103 has received from a client 102 a schedule display request for displaying the schedule data of the 7-day period from Jun. 30, 1997, of the user having the user ID "User 001". The schedule display process of the schedule data operating unit 108 starts as shown in FIG. 4.

First, in step 401, the display process sets "User001", "Jun. 30, 1997" and "7 days" in the received schedule display request as the search keys for the referred user ID, the starting date and the number of days, respectively. The data (record) conforming to the conditions of the search keys are acquired from the schedule of the user ID "User001" in the schedule data storage unit 106. In the example record of FIG. 2, Nos. 1 to 8 are acquired (step 402). The user ID of the request source is compared with the referred user ID (step 403).

If the user ID of the request source coincide with the referred user ID, it indicates that the display is requested by the owner of the schedule. Therefore, the reservation state of the record in the schedule data storage unit 106 corresponding to the record having the reservation state "unread" in the data acquired at step 402 is changed to "suspended" (step 410). After that, the schedule data acquired at step 402 are all transmitted to the client as display data (step 409). At step 410, only the data reservation state in the schedule data storage unit 106 is updated, and therefore the reservation state "unread" in the display data transmitted to the client is not changed.

An example display of the display data on the client is shown in FIG. 5. Numeral 501 in FIG. 5 corresponds to record No. 1 in FIG. 2, 502 to record No. 2, 503 to record No. 3, 504 to record No. 8 and 505 to record No. 4.

If the user ID of the request source and the user ID of the reference fail to coincide with each other at step 403, the number of schedule data acquired at step 402 is substituted into the variable Count (step 404), and the leading data of the schedule data list acquired is compared to see whether the reservation state of the schedule data is "-" or not (step 405). If it is "-", the data is not the reservation schedule data but a schedule set by the referred user himself, and therefore the schedule data is added unconditionally to the display data (step 407). In the case where the data is found to be the reservation schedule data at step 405, on the other hand, the display or no-display is determined from the reservation state of the schedule data and the data in the definition data storage unit 107 (step 406).

In the case where the system has only one definition data under this condition, the particular definition data is referred to. In the case where the definition data is produced for each user ID, on the other hand, the definition data for the schedule owner (User001) is referred to.

The "display" data in the definition data is compared with the reservation state of the schedule data, and only the schedule data of "O" is selected (step 407). In the example of FIG. 3, only the record with the reservation state of "approved" and "unread" are the object to be displayed. Thus, Nos. 1, 2 and 5 of the schedule data for "User001" in FIG. 5 are selected. The variable Count is decremented by one (step 408), and as long as the variable Count is larger than zero, the process of steps 405 to 408 is repeated. Once the schedule data to be displayed is determined, the schedule data is transmitted to the display request source client (step 409).

An example of display on the client is shown in FIG. 6. Numeral 601 in FIG. 6, corresponds to record No. 1 in FIG. 2, 602 to record No. 2, and 603 to record No. 8. On the other hand, FIG. 5 shows an example display of the schedule data list as seen on the client 102 by the user "User001" himself of the reference for comparison. Numeral 503 in FIG. 5 represents the reservation state "suspended" of the schedule. Once the definition data is acquired in FIG. 3, therefore, "no display" is indicated for the state. Thus, the schedule data corresponding to 503 is not displayed in "the schedule list referred to by another client".

Also, when one of the schedule data displayed as shown in FIGS. 5 and 6 on the client is selected by the user and detailed information display is designated by the pull-down menu or the like, the client displays all the items available in FIG. 2.

Figure 7:
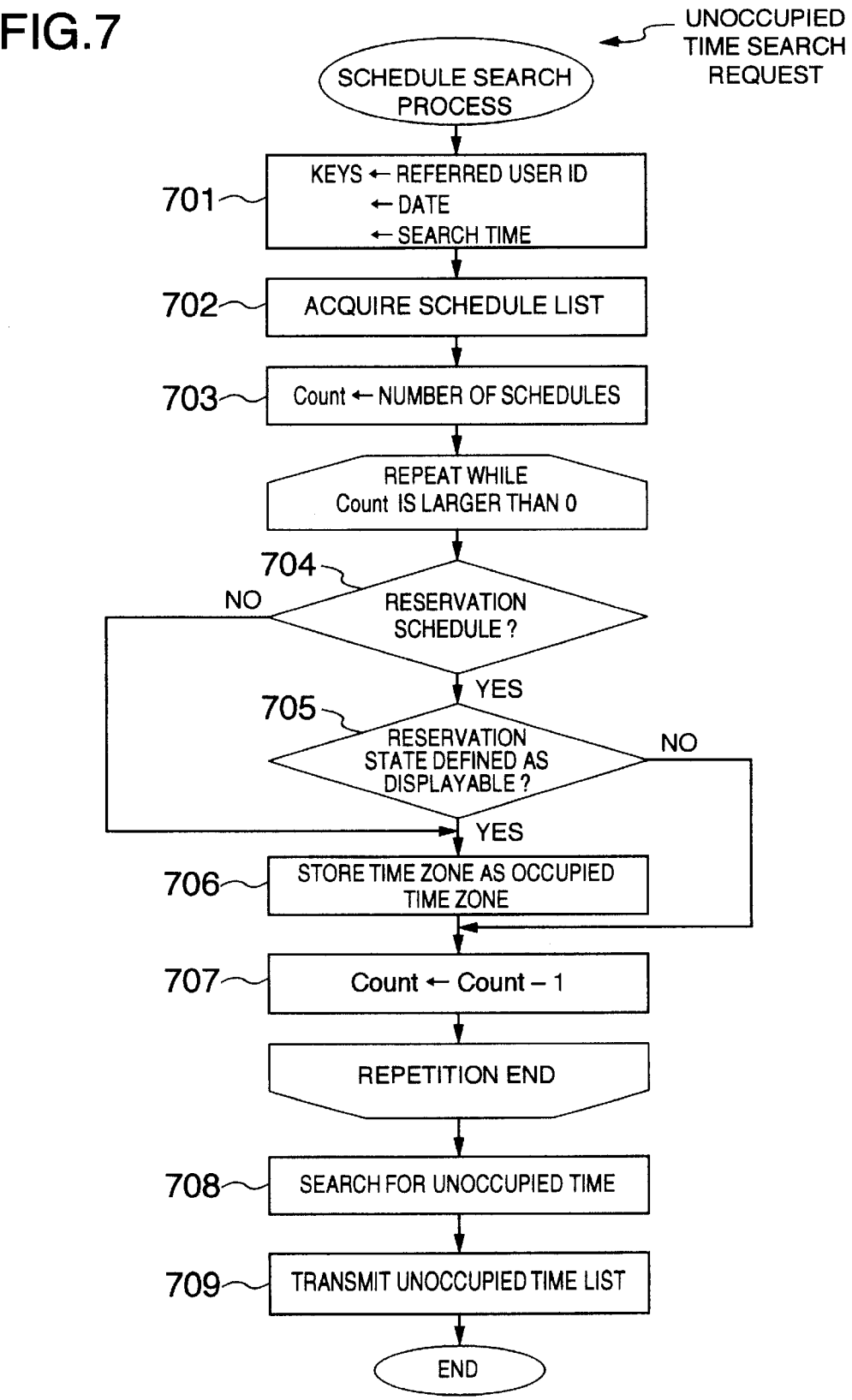
FIG. 7 is a flow chart showing the operation of receiving an unoccupied time search request.

Assume that the server 103 has received from the user (User002) of the client 102 an unoccupied time search request for another user (User001). The schedule search process of the schedule data operating unit 108 starts as shown in FIG. 7. Assume that User002 has set one hour on Jun. 30, 1997, as a condition for the search.

At step 701, the search process sets the referred user ID, the date and the search time zone as "User001", "Jun. 30, 1997" and "One hour" in the received unoccupied time search request, respectively, as search keys. Then, the client 102 acquires the schedule data including the user ID of "User001" and the date of "Jun. 30, 1997" from the schedule data storage unit 106. In the example of the record shown in FIG. 2, Nos. 1 to 8 are acquired (step 702). The number of the schedule data acquired is substituted into the variable Count (step 703), and from the leading data in the schedule data list acquired, the reservation state of the schedule data is compared to see whether it is "-" or not (step 704). If it is "-", it indicates that the schedule is set by the referred user himself. Therefore, the process unconditionally proceeds to step 706, and the time zone of the schedule data is stored as an occupied time zone (a time zone not unoccupied), and the process proceeds to step 707. In the case where the result of comparison is not "-", the display/no-display information is acquired from the definition data in the definition data storage unit 107 using the reservation state of the schedule data. Which definition data is referred to is determined at step 705 in the same manner as the schedule display process. If the reservation state of the schedule data is defined as displayable, the particular reservation schedule is handled as established. In other words, the time zone of the schedule data is stored at step 706 as an occupied time zone, and the process proceeds to step 707. In the case where the reservation state of the schedule data is defined as non-displayable, on the other hand, the process proceeds directly to step 707. In other words, the time zone of the schedule data is handled as an unoccupied time. At step 707, the variable Count is decremented by one, after which the process of steps 704 to 707 is repeated as long as the variable Count is larger than zero. Next, at step 708, the unoccupied time is searched for by reflecting the stored data in the occupied time zone. Specifically, during the designated period, i.e. from 0000 hours until 2400 hours on Jun. 30, 1997, the time zone lasting at least one hour continuously in other than the stored unoccupied time zone is used as an unoccupied time. Once the unoccupied time is determined, an unoccupied time list is transmitted to the client (step 709).

An example of display of the unoccupied time list on the client is shown in FIG. 8. On the client, the user selects one of the unoccupied times displayed as shown in FIG. 8, and designates the reservation registration by a pull-down menu or the like. Thus, a reservation registration request can be transmitted to the server 103.

Assume that the server 103 has received a reservation registration request for the schedule data from a client 102. The schedule reservation registration process in the schedule data operating unit 108 starts as shown in FIG. 9. A case in which the user of "User002" registers the reservation of the schedule data of the user of "User001" will be described.

At step 900, the reservation registration process sets the user ID (User001) to be schedule-registered and the search date (Jun. 30, 1997) in the received reservation registration request as search keys. A list of the schedule data on the search date of the user ID "User001" is acquired from the schedule data storage unit 106 of the server 103. In the example of the record shown in FIG. 2, the schedule data Nos. 1 to 8 are acquired (step 901). Then, in step 902, the number of the schedule data acquired is substituted into the variable Count. Next, at step 903, from the received reservation registration request the starting time and the ending time of the new schedule data to be registered are obtained. The schedule data acquired at step 901 are checked sequentially from the leading data to see whether the new schedule data is registered without any problem.

First, step 904 checks whether the time zone of the new schedule to be registered is overlapped with the time zone of the existing schedule data. If the time zones are not overlapped, the process immediately proceeds to step 907. If the time zones are overlapped even partially, the process proceeds to step 905 for checking whether the existing schedule data is for a reservation schedule or not. If it is not a reservation schedule, i.e. if the reservation state of the schedule data is "-", the process proceeds to step 907. In the case where the existing schedule data is for a reservation schedule, on the other hand, the process proceeds to step 906, where the possibility of registration is determined from the reservation state of the existing schedule data and the data in the definition data storage unit 107.

In the case where the system has one definition data, the particular definition data is referred to. In the case where the definition data is produced for each user ID, on the other hand, the definition data for the user ID (User001 in this case) to be schedule-registered is referred to.

The "registration" data in the definition data is compared with the reservation state of the existing schedule, and if the result is "O", the registration of the new schedule data is permitted.

If the definition shown in FIG. 3 is involved, the registration of a new schedule is not permitted only when the reservation state of the existing schedule data is "approved", and the new schedule can be registered in cases other than "approved". When the registration is permitted, the process proceeds to step 907. At step 907, 1 is decremented from the variable Count. After that, the next existing schedule data are checked repeatedly at steps 904 to 906.

When the variable Count reaches 0 as a result of the repetition, it is determined that none of the existing schedule data on the search date is adversely affected by the registration of a new schedule data. Thus, the new schedule data is registered at step 908, and the completion of the reservation registration is notified to the client, then ending the whole process.

In the case where the reservation state of the existing schedule data does not permit the registration of a new schedule data in step 906 during the repetition, on the other hand, the process immediately proceeds to step 909, and the client is notified that the new schedule data could not be registered, then ending the whole process. Step 909 can be modified in such a manner that a notice prompting the input of a correction of the time zone of the new schedule data is transmitted to the client and when a correction input is received, the process is repeated from step 900.

The schedule data operating unit 108 of the server 103 performs the following additional tasks.

As shown in FIG. 10, upon receipt of an approval/disapproval request (1005) of a schedule data in "suspended" state from a client, the schedule data operating unit 108 checks the request source user ID and the user ID of the owner of the particular schedule data. Only when both are coincident with each other and the reservation state of the schedule data is "suspended", the reservation state is updated in accordance with the received request, and the request source is notified of the complete updating (1006).

In the case where a request (1007) for checking the reservation state of the schedule data of which the reservation has been registered is received from the client as shown in FIG. 10, the schedule data operating unit 108 reads the reservation state of the particular schedule data and transmits it to the request source (1008).

Also, the schedule data operating unit 108 checks the schedule data in the schedule data storage unit 106 regularly, and deletes the schedule data for which a predetermined storage period is overdue. In the case where the storage period is determined as three months, for example, the data that have passed three months from the date of the schedule data are deleted. For deletion of old schedule data, the storage period can be set for each user ID or such data can be deleted in response to a schedule data delete request from a client.

When checking the schedule data in the schedule data storage unit 106 regularly, the schedule data operating unit 108 can transfer the past schedule data to a place other than the storage unit 106 and store them there.

(5) Modifications

In the embodiments, a system for communication between clients and a server via a communication network is described. As an alternative, the functions of the server and the clients can be integrated so that a system may be configured of one computer and more than one terminals or remote terminals.

In FIG. 9, a registered schedule is always permitted to overlap with an existing schedule in the reservation state of "-", i.e. an existing schedule set by the schedule owner. This can be modified in such a way that the established state of the schedule set by the schedule owner is also classified and registered in the definition data as additional data. In the schedule registration process, an overlapped reservation registration of a new schedule requested from a different client may not be permitted in the case where the degree of established state is high in the classification.

The four reservation states were described above as "approved", "disapproved", "suspended" and "unread". In addition, the states such as "provisionally approved" and "delegated" can be defined. In such a case, a similar determination is possible if "provisionally approved" and "delegated" are additionally defined as the items of FIG. 3. The permission of display and registration is determined in accordance with the definition in the definition data storage unit 107. Therefore, if the process corresponding to the reservation state is added to the definition, it can be reflected in the determination process of steps 406, 705 and 906.

In the embodiment, when the schedule display request from the schedule owner is received, the schedule display process (FIG. 4) updates the schedule data from "unread" to "suspended" at step 410. Alternatively, the schedule data may not be updated when the display request is received. And when the detailed information display request from the schedule owner is received, the schedule data may be updated from "unread" to "suspended".

What is claimed is:

1. A schedule management system comprising:
    a schedule data storage unit for storing schedule data including the identifier of the owner of each schedule and the time zone, the activity and the reservation state;
    a definition data storage unit for storing definition data which defines whether or not a new reservation for reserving a schedule is accepted and defines whether or not the schedule is permitted to be displayed in accordance with the reservation state representing said owner's response to the schedule data in said schedule data storage unit;
    schedule data registration means for accepting a request for reserving a schedule ad determining whether the registration of said reservation schedule is permitted or not based o the reservation state existing in said schedule data storage unit and said definition data, and registering said reservation schedule in said schedule data storage unit when said registration is permitted;

schedule data approval means for accepting a request for approval/disapproval of a schedule from the owner of a schedule and rewriting the reservation state of the corresponding schedule data in said schedule data storage unit;

schedule display means for accepting a request for displaying a schedule, determining whether said schedule existing in said schedule data storage unit is displayed or not on said terminal which provides a request for reserving a schedule based on the reservation state of said existing schedule and said definition data, and displaying only the schedule data which is determined to be displayed; and unoccupied time search means for accepting a request for searching for an unoccupied time for a schedule, determining whether the time zone of said schedule is rendered an occupied time or not based on the reservation state of the schedule data existing in said schedule data storage unit and said definition data, and in the case where said time zone of said schedule is rendered an occupied time zone, displaying an unoccupied time by removing said time zone of said schedule from the unoccupied time.

2. A schedule management system according to claim 1, further comprising one definition data table.

3. A schedule management system according to claim 1, wherein each user of the system has a definition data table, and said schedule data registration means and said schedule display means refer to the definition data table of the user who is the schedule owner for which the schedule is registered and displayed.

4. A schedule management system according to claim 1, wherein the reservation state of said schedule data is determined as "unread" when said schedule is newly registered by said schedule data registration means, rewritten as "approved" when approved by the owner of said schedule and as "disapproved" when not approved by the owner of said schedule by said schedule data approval means.

5. A schedule management system according to claim 1, wherein the reservation state of said schedule data is rewritten as "suspended" when said schedule data is read out by the owner of said schedule by said schedule data display means.

6. A schedule management system according to claim 1, comprising a server, at least one client and a communication network connecting said server and said client;

wherein said schedule data storage unit and said definition data storage unit are included in said server, and said schedule data registration means, said schedule data approval means and said schedule display means are realized by being distributed between said server and said client.

7. A schedule management method comprising the steps of:

preparing a schedule data storage unit for storing the schedule data including the identifier of the owner of a schedule and the time zone, the activity and the reservation state;

preparing a definition data storage unit for storing definition data which defines whether or not a new reservation registration request from a terminal which provides a request for reserving a schedule is accepted and defines whether or not the schedule is permitted to be displayed in accordance with the reservation state in said schedule data storage unit;

accepting a request for reserving a schedule, determining whether the registration of said reservation schedule is permitted or not based on the schedule state of the schedule data existing in said schedule data table and said definition data, and in the case where said registration is permitted, registering said reservation schedule representing said owner's response to the schedule data in said schedule data table;

accepting a schedule approval/disapproval request from the owner of a schedule, and rewriting the schedule state of the corresponding schedule data in said schedule data table;

accepting a schedule display request, determining whether the schedule existing in said schedule data table is displayed or not to said another client based on the schedule state of the schedule data existing in said schedule data table arid said definition table, and displaying only the schedule data which is determined to be displayed; and accepting a request for searching for an unoccupied time for said schedule, determining whether the time zone of said schedule is rendered an occupied time based on the schedule state of the schedule data existing in said schedule data storage unit and said definition data, and when said time zone is rendered an occupied time, displaying an unoccupied time by removing the time zone of said schedule from the unoccupied time.

8. A machine-readable storage medium for storing a program of instructions executable by machine, said program comprising, for schedule management, the steps of:

upon acceptance of a request for reserving a schedule, determining whether the registration of said reservation schedule is permitted or not, based on a reservation state existing in a schedule data storage unit for storing the schedule data including the identifier of the owner of a schedule, and the time zone, the activity and the state of said schedule, and definition data which defines whether or not a new reservation registration request from a terminal which provides a request for reserving a schedule is accepted and defines whether or not the schedule is permitted to be displayed in accordance with the reservation state representing said owner's response to the schedule data in said schedule data storage unit, and when said registration is permitted, registering said reservation schedule in said schedule data storage unit;

upon acceptance of a request from the owner of said schedule for approving/disapproving a schedule, rewriting the schedule state of the corresponding schedule data in said schedule data table;

upon acceptance of a request for displaying said schedule, determining whether said schedule existing is displayed or not to said another client based on the schedule state of the schedule data existing in said schedule data storage unit and said definition table, and displaying only the schedule data determined to be displayed; and upon acceptance of a request for searching for an unoccupied time for said schedule, determining whether the time zone of said schedule is rendered an occupied time based on the schedule state of the schedule data existing in said schedule data storage unit and said definition data, and when said time zone is rendered an occupied time, displaying an unoccupied time by removing the time zone of said schedule from the unoccupied time.

9. A schedule management system according to claim 1, wherein the reservation state of each schedule data is one of "unread", "suspended", "disapproved" and "approved" and the reservation state is changed by an operation of the schedule owner.

10. A schedule management system according to claim 7, wherein the reservation state of each schedule data is one of "unread", "suspended", "disapproved" and "approved" and the reservation state is changed by an operation of the schedule owner.

11. A schedule management system according to claim 8, wherein the reservation state of each schedule data is one of "unread", "suspended", "disapproved" and "approved" and the reservation state is changed by an operation of the schedule owner.

* * * * *